Patented Dec. 26, 1939

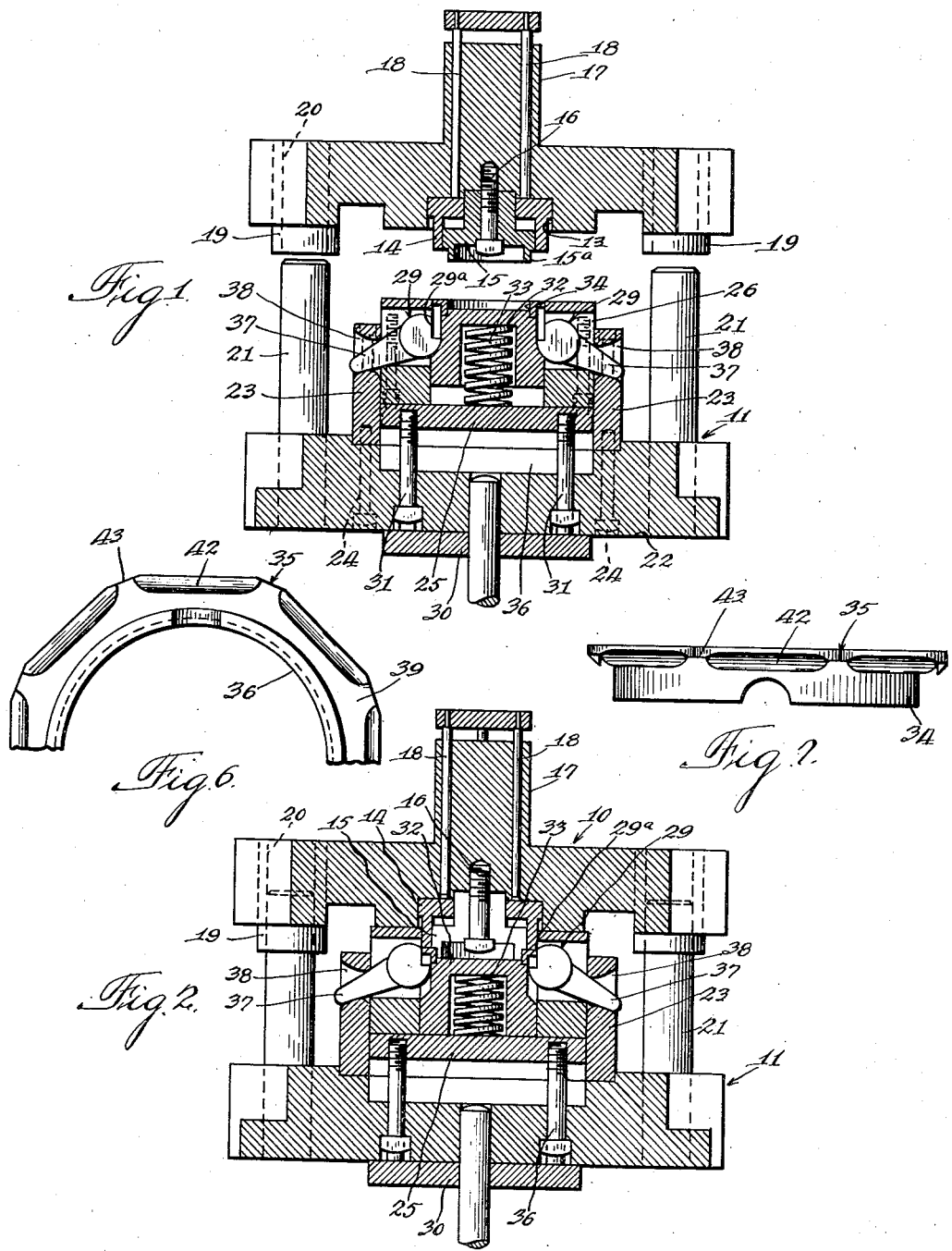

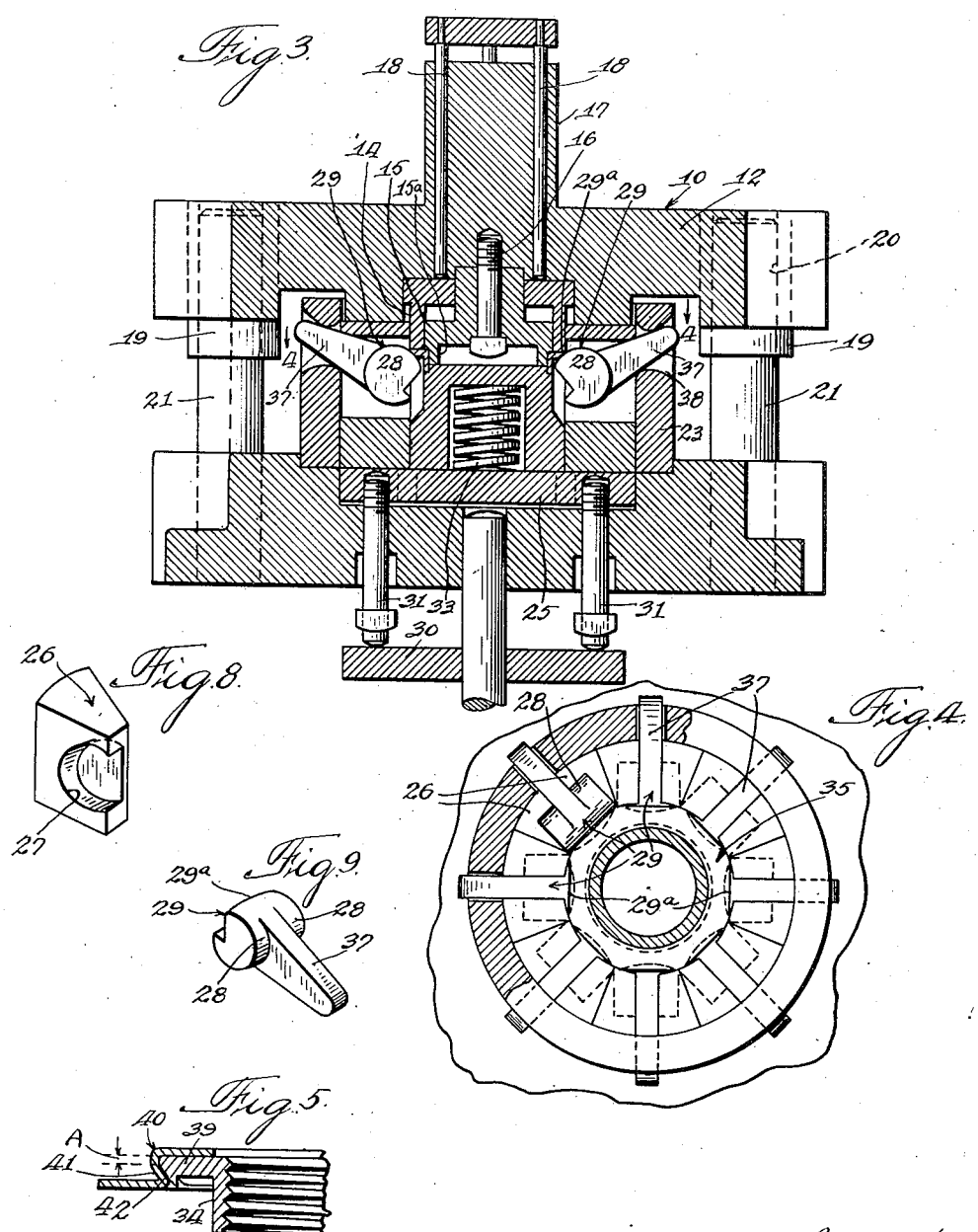

2,184,949

UNITED STATES PATENT OFFICE 2,184,949

METHOD OF FORMING A BUSHING RING

Sol Schwartz, Chicago, Ill., assignor to Barrel Fitting & Seal Corporation, Chicago, Ill., a corporation of Illinois Original application January 21, 1937, Serial No. 121,431, now Patent No. 2,144,346, dated January 17, 1939. Divided and this application September 20, 1937, Serial No. 164,672

3 Claims. (Cl. 29—148.2)

This invention relates to a method of forming a bushing ring, and has special reference to a method of forming a bushing ring as is employed in bushing structures particularly in the construction of metal barrels and other containers such as are used for storing or shipping oils or other liquids or semi-liquids, the bushing structure being adapted to receive a bung or other closure means in a fluid-tight relation. This application is a division of application Serial No. 121,431, filed by applicant on January 21, 1937, and which has issued into Patent No. 2,144,346, dated January 17, 1939.

The socket with which the bung ring is to be associated in the bushing structure is preferably formed outwardly from the material surrounding a hole in a supporting wall of the barrel or other container, the socket being either polygonal or circular in contour and initially having straight or substantially vertically extending side walls. The bushing structure in a completed state therefore comprises the combined bung ring and socket elements in which the opposite edges of a flange of the bung ring are inwardly converged to be engaged by the side walls of the socket to hold the ring against displacement, the side walls being initially vertically formed to permit the entrance of the bung ring.

The present invention contemplates the method of forming a connecting means or bung ring for receiving in a removable relation therewith a closure or bung, the connecting means being preferably formed of sheet material in the following manner: Forming a flange of polygonal contour on and at substantially right angles to the axis of a cylindrical collar in any usual manner, and in displacing the material of the flange about the polygonal periphery thereof to produce edges having a tapered relation with the main body portion of the flange. In other words, the material of the flange is so displaced that when viewed in cross section the edges of the flange converge in an inward direction toward the collar. The tapered edge thus produced affords a substantial surface over which the material of the socket may be formed to secure the bushing against displacement.

In displacing the material of the flange about the polygonal periphery thereof to produce inwardly converging edges when viewed in cross section, it is preferable to insert a radial pressure in a direction of the depth of the flange and toward the axis of the collar. In this method of forming the bushing, the inwardly converging edges are dished so that when the wall of the socket is formed thereagainst there is no tendency for the walls to spring away from the edges against which they are formed. Many advantages flow from the use of a sheet metal construction formed in the manner outlined above and these advantages generally have been set out in a copending application, Serial No. 34,596, filed August 3, 1935, patented October 4, 1938, as Patent No. 2,131,978, and assigned to the assignee of the present application. The present invention is directed to an improved manner of displacing the material of the flange to provide for the inwardly converging edges.

Other objects and advantages of this invention will hereinafter be more particularly pointed out and for a more complete understanding of this invention reference may now be had to the accompanying drawings when taken together with the following description, in which latter:

Figure 1 is a central vertical sectional view of an apparatus employed in the method of this invention for operating upon a bushing ring;

Fig. 2 is a view similar to Fig. 1, showing a changed position of the apparatus;

Fig. 3 is a view similar to Fig. 1 on an enlarged scale showing the final step in the operation;

Fig. 4 is a fragmentary plan sectional view taken on the line 4—4 of Fig. 3;

Fig. 5 is a fragmentary sectional view showing a portion of the bushing ring and socket assembly;

Fig. 6 is a fragmentary elevational view from the underneath side of the bung ring;

Fig. 7 is a fragmentary side elevational view of the bushing ring of Fig. 6;

Fig. 8 is a perspective view of one of the segmental pieces for receiving a trunnion of a jaw member employed for operating upon the bushing ring; and Fig. 9 is a view of one of the jaw members, one trunnion of which is received in a recess of the segmental piece illustrated in Fig. 8.

Referring now to the drawings and more particularly to Figs. 1 to 4, inclusive, thereof, an apparatus is shown for operating upon the bushing ring to produce inwardly converging dished edges thereon when viewed in cross section, the apparatus being illustrated in the form of a punch member 10 for co-operation with a die member 11.

The punch holder 10 comprises a plate 12 having a central recess 13 on one face thereof for receiving a substantially cup-shaped member 14 in frictional engagement therewith. A positioning member 15 is mounted within the cup-shaped member 14 and is held in position therein with respect to the plate 12 by means of a threaded bolt 16 or other suitable means. A shank 17 of the punch holder 10 extends centrally of the plate 12 and upwardly therefrom for engagement with the movable portion of a press, there being preferably a pair of knock-out rods 18 extending through the shank 17 of the punch holder 10 for engagement with the cup-shaped member 14 to displace the latter together with the positioning member 15 when it is desired to dis-assemble the punch. The plate 12 is also provided with a plurality of bushings 19 having apertures 20 therethrough acting as guideways for co-operation with a guide rod 21 secured to and extending upwardly from a plate 22 of the die.

The die member 11 comprises the plate 22 which is preferably fixed to the bed of the press, a collar 23 being secured within a recess on the upper surface of the plate 22 by means of bolts 24. A base 25 is disposed within the ring 23 and is guided thereby in a vertical or axial movement thereof, the base 25 supporting a plurality of segmental pieces 26.

Referring now more particularly to Figs. 4, 8, and 9, it will be noted that the segmental pieces 26 are provided in co-operating pairs, each pair being spaced and being provided with opposed recesses 27 for receiving trunnions 28 of jaw members 29. Adjacent segmental pieces engage each other and are engaged by bolts 25a or similar means extending from the base 25 for preventing displacement thereof and of the jaw members while, as above stated, co-operating pairs of segmental members are spaced to receive therebetween the trunnions 28 of the jaw members.

The base 25 is held in a normal inoperative extended position such as is shown in Fig. 1 by a resiliently supported member 30 operating through the spacing bolts 31 which engage threaded apertures in the bottom of the base 25. A bushing ring holder 32 is resiliently supported by means of a compression spring 33 on the base 25, the holder having a reduced extension providing a seat to receive and to position a portion of the cylindrical neck 34 of the bushing ring 35. It will thus be seen that the bushing ring holder 32 is movable axially with respect to the base 25 against the compression of the spring 33, and the base 25, in turn, is movable axially with respect to the fixed support or plate 22 and ring 23, there being a recess 36 in the plate 22 below the recess for the ring 23 to receive the base 25 in a lowered position.

A jaw member 29 is preferably provided for each of the flat sides of the polygonal flange of the bushing ring. Each of the jaw members is provided with an extension 37 for engagement with the fixed ring 23, the extensions preferably extending through apertures 38 in the ring. In this manner a relative movement between the base 25 and the ring 23 will operate the jaw members.

Each of the jaw members 29 is provided with an arcuate engaging face 29a, the radius for which is disposed off center relative to the axis of the trunnion or the axis about which the jaw members pivot. A pivotal movement in one direction of the jaw members moves the engaging faces radially inwardly and, of course, a pivotal movement of the jaw members in the opposite direction moves the engaging faces in a direction radially outwardly from each other. Thus the jaw members are said to have arcuate engaging faces eccentrically disposed with respect to the axes of the jaw members, the jaw members having their axes equidistantly spaced from the central axis of the apparatus. It is to be understood, however, that a pivotal movement of the jaws describes but one form of movement thereof, although a slidable jaw or a jaw having other relative movement may be substituted therefor.

In the operation of the apparatus thus described, the initial and inoperative condition of the apparatus is shown in Fig. 1, the bushing ring holder 32 and the base 25 being fully extended by the action of the compression spring 33 and the resilient support 30, respectively. The bushing ring 35 is operated upon in a single operation although we will hereafter consider the successive steps in that single operation. In Fig. 1 the jaw members are so positioned that the diametrically opposed engaging faces are a maximum distance apart and in position to operate upon the bung ring. A movement downwardly of the punch 10 and associated members to the position shown in Fig. 2 and a reduced extension 15a of the positioning member 15 fitting within the bushing ring 39 cause a movement of the bushing ring holder 32 against the tension of the spring 33 into engagement with the base 25, the resilient support 30 being sufficiently strong to overcome the compression of the spring 33. This initial movement brings the bushing ring 35 into such a position that an initial engagement may be had on the flange thereof by the arcuate engaging faces of the jaw members.

A continued movement of the punch member 10 in a downward direction overcomes the compression of the resilient support 30 and carries the base member 25 downwardly so that relative movement is had between the base and the fixed support or ring 23. A relative movement between the base for supporting the jaw members and the fixed support or ring 23 causes a pivotal movement of the jaw members 29 which, in turn, operate the arcuate engaging faces eccentrically to shorten the distance between diametrically opposed spaces to displace the material of the flange 39 of the bushing ring 35 to produce inwardly converging edges. By reason of the engaging faces being arcuate, the converging edges are dished inwardly as shown more particularly in Fig. 5.

Referring now more particularly to Figs. 4 to 9, inclusive, it will be noted that not only have the engaging faces of the jaw members 29 an arcuate contour in a direction about the axes thereof, but the engaging faces are also arcuately formed in the direction of the axes of the jaw members so that in the finished article, as is shown in Fig. 6, there are no sharp corners against which material may be urged whereby fractures may be caused.

The bushing ring 35 may preferably be employed in combination with a socket formed from the material of the barrel wall or other supporting body with which it is employed. In Fig. 5 the bung ring 35 is employed in combination with the outwardly directed socket 40, the wall 41 of of the socket being forced against the inwardly converging dished edges or faces 42 of the polygonal sides of the flange 39 of the ring. By reason of the converging edge of the flange of the bushing ring being dished, there is not the same tendency for the material of the wall 41 of the socket to spring away from its engagement therewith after the jaws of a forming tool have urged the more or less resilient metal of the barrel thereagainst.

The dished faces 42, which converge inwardly when viewed in cross section, are preferably spaced and in this manner permit the material of the flange therebetween to remain as a straight edge. The normal point of intersection of the polygonal sides are somewhat rounded as at 43, to eliminate sharp edges. Also, the converging edges or faces begin on a line substantially spaced from the upper face of the flange, as indicated at A in Fig. 5, to likewise eliminate sharp edges. Such construction obviates the necessity of perfect positioning of the bung ring in the socket therefor and augments the normal action in preventing relative rotation therebetween.

While but a single embodiment of this invention is herein shown and described, it is to be understood that various modifications thereof may be apparent to those skilled in the art without departing from the spirit and scope of this invention and therefore the same is only to be limited by the scope of the prior art and the appended claims.

I claim:

1. The method of forming a bushing ring from a cylindrical collar having a flange extending at substantially right angles to the axis of said cylindrical collar, the flange having a plurality of angularly disposed faces about the periphery thereof, which consists in upsetting the material of the faces of the flange to produce out of a single thickness of said flange inwardly converging edges when said ring is viewed in cross section.

2. The method of forming a bushing ring from a cylindrical collar having a flange extending at substantially right angles to the axis of said cylindrical collar, the flange having a plurality of angularly disposed faces about the periphery thereof, which consists in exerting a pressure in a direction toward the axis of the collar to upset the material of the faces of the flange to produce out of a single thickness of said flange inwardly converging edges when said ring is viewed in cross section.

3. The method of forming a bushing ring from a cylindrical collar having a flange extending at substantially right angles to the axis of said cylindrical collar, the flange having a plurality of angularly disposed faces about the periphery thereof, which consists in exerting a radial pressure in a direction of the depth of the flange and toward the axis of the collar to upset the material of the faces of the flange to produce inwardly converging edges when said ring is viewed in cross section.

SOL SCHWARTZ.